United States Patent
Mizutani et al.

(10) Patent No.: US 8,929,734 B2
(45) Date of Patent: Jan. 6, 2015

(54) MULTIPLEXER/DEMULTIPLEXER AND MULTIPLEXING/DEMULTIPLEXING METHOD

(75) Inventors: Kenji Mizutani, Tokyo (JP); Akio Tajima, Tokyo (JP); Masahiro Sakauchi, Tokyo (JP); Tomoyuki Hino, Tokyo (JP); Masahiro Hayashitani, Tokyo (JP); Hiroyuki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 13/805,495

(22) PCT Filed: Jun. 15, 2011

(86) PCT No.: PCT/JP2011/064190
§ 371 (c)(1),
(2), (4) Date: Dec. 19, 2012

(87) PCT Pub. No.: WO2011/162269
PCT Pub. Date: Dec. 29, 2011

(65) Prior Publication Data
US 2013/0094853 A1    Apr. 18, 2013

(30) Foreign Application Priority Data
Jun. 24, 2010 (JP) ................ 2010-143957

(51) Int. Cl.
*H04B 10/00* (2013.01)
*H04J 14/02* (2006.01)
*G02B 6/293* (2006.01)
*H04B 10/079* (2013.01)

(52) U.S. Cl.
CPC .............. *H04J 14/02* (2013.01); *G02B 6/2938* (2013.01); *H04B 10/0795* (2013.01); *H04B 10/07953* (2013.01)

USPC .................................. 398/48; 398/1

(58) Field of Classification Search
USPC ..................................... 398/1, 48
See application file for complete search history.

(56) References Cited

U.S. PATENT DOCUMENTS 8,406,625 B2 * 3/2013 Chung et al. ............... 398/50
2003/0185565 A1 10/2003 Wang et al.

FOREIGN PATENT DOCUMENTS

JP    9-233052 A    9/1997
JP    2000-121847 A    4/2000

(Continued)

OTHER PUBLICATIONS

Masahiko Jinno, et al., "Spectrum-Efficient and Scalable Elastic Optical Path Network: Architecture, Benefits, and Enabling Technologies", IEEE Communications Magazine, Nov. 2009, pp. 66-73, vol. 47, USA.

(Continued)

*Primary Examiner* — Danny Leung
(74) *Attorney, Agent, or Firm* — Sughrue Mion, PLLC

(57) ABSTRACT

In order to realize a multiplexer/demultiplexer in which utilization efficiency of a frequency is high, wavelength characteristics of a transmission band is flat, the cost is low, the size is small, and a wavelength and a band are variable, the multiplexer/demultiplexer includes: first light branching means for branching inputted light into plurality of pieces of light and outputting the branched pieces of light; a plurality of light wavelength separating means for separating and outputting light outputted from the first light branching means for each of predetermined frequency bands; and an optical coupling means for making outputs having frequency bands different from each other among outputs from the light wavelength separating means gather and be outputted.

10 Claims, 12 Drawing Sheets

(56) References Cited

FOREIGN PATENT DOCUMENTS

| | | |
|---|---|---|
| JP | 2002-368699 A | 12/2002 |
| JP | 2003-315570 A | 11/2003 |
| JP | 2004-212829 A | 7/2004 |
| JP | 2006-074806 A | 3/2006 |
| JP | 2008-203508 A | 9/2008 |
| JP | 2009-004858 A | 1/2009 |
| JP | 2009-095019 A | 4/2009 |
| JP | 2009-210788 A | 9/2009 |
| JP | 2009-210841 A | 9/2009 |
| WO | 2006/008873 A1 | 1/2006 |

OTHER PUBLICATIONS

Glenn Baxter, et al., "Highly programmable Wavelength Selective Switch based on Liquid Crystal on Silicon switching elements", Optical Fiber Communication Conference and 2006 National Fiber Optic Engineers Conference, OFC 2006, OTuF2, Mar. 2006, USA.

* cited by examiner

MULTIPLEXER/DEMULTIPLEXER AND MULTIPLEXING/DEMULTIPLEXING METHOD

CROSS REFERENCE TO RELATED APPLICATIONS

This application is a National Stage of International Application No. PCT/JP2011/064190 filed Jun. 15, 2011, claiming priority based on Japanese Patent Application No. 2010-143957 filed Jun. 24, 2010, the contents of all of which are incorporated herein by reference in their entirety.

TECHNICAL FIELD

The present invention relates to a multiplexer/demultiplexer and a multiplexing/demultiplexing method which performs multiplexing/demultiplexing of wavelength-multiplexed light signals, and, more particularly, to a multiplexer/demultiplexer and a multiplexing/demultiplexing method which can set a wavelength and a band in which multiplexing/demultiplexing is performed.

BACKGROUND ART

Following increased demand for distribution of high-resolution moving picture and the popularization of bidirectional real time image services represented by a video phone in recent years, speedup and capacity increase beyond 100 Tbps is desired for a future optical communication network. In order to realize speedup and capacity increase of an optical communication network, it is necessary to use a frequency more effectively in addition to speedup in a time axis and widening in a frequency axis. For example, non-patent document 1 has proposed a communication system aiming at improvement of utilization efficiency of a frequency. In this optical communication system, the frequency utilization efficiency is improved by optimization of the multiplex mode of the optical communication system, and a multiplexing/demultiplexing apparatus having a variable pass frequency band is used to enable maximum use of the above-mentioned multiplex mode. As a result, in an optical communication system disclosed in non-patent document 1, further high-efficient use of a frequency can be realized.

Patent document 1 proposes, about a multiplex method for high-efficient use of a frequency used by an optical communication system, a method which combines both of an orthogonal frequency division multiplex method used for wireless transmission and a coherent communication method. Hereinafter, the orthogonal frequency division multiplex method is described as OFDM. OFDM is one of frequency (that is, wavelength) division multiplex methods the same as a WDM (wavelength division multiplexing) communication method that is the mainstream in optical communication systems. By orthogonalizing a plurality of channels for sending data with each other, OFDM permits overlap on a frequency. For this reason, by adopting OFDM, the utilization efficiency of a frequency in an optical communication system can be improved.

Also, in the OFDM technology, in order to separate a plurality of orthogonalized channels a coherent communication technology is used. A digital coherent receiver used in the coherent communication technology takes out intensity information and phase information on light using local light, and performs channel separation by digital signal processing using a DSP (digital signal processor). Here, at the time of channel separation in OFDM, it is desired that loss in each channel is constant with respect to frequencies. Accordingly, for optical parts arranged in a midway between a transmission unit and a reception unit of an optical communication system adopting OFDM, it is required that transmission characteristics in which loss in respective channels used by OFDM is constant and wavelength characteristics of loss in a channel is flat.

Described below are technologies for realizing flat transmission characteristics in which a bandwidth to be used can be selected freely, and loss in a plurality of channels used by OFDM is constant.

Non-patent document 2 discloses a phase controlling device using LCOS (liquid crystal on silicon). A phase controlling device disclosed in non-patent document 2 includes a collimate lens, a grating and a spatial optical system using LCOS. The grating separates signals of different frequencies spatially, and the LCOS operates as an optical switch by performing phase control of the signals by a liquid crystal. The phase controlling device disclosed in a non-patent document 2 realizes band-variable characteristics and wavelength-variable characteristics by controlling liquid crystal elements used for an optical switch.

Patent document 2 discloses a structure of an optical variable filter equipped with a function that changes a wavelength and a bandwidth independently. The optical variable filter disclosed in patent document 2 has a device of a spatial optical system consists of a grating and a reflector. By performing fine position control of reflectors mechanically, respectively, using a mechanical structure such as a stepping motor, the optical variable filter disclosed in patent document 2 performs variable control of a wavelength and a band.

Compared with a phase controlling device using LCOS, the optical variable filter disclosed in patent document 2 has a merit that a variable range of a wavelength and a band can be wide and it can be manufactured inexpensively. By combining such optical variable filter with a 1×n coupler which is an optical branching part, a 1×n multiplexer/demultiplexer having variable band characteristics and wavelength characteristics can be realized.

Patent document 3 describes a structure of a wavelength multiplexing separation filter which is made by combining an AWG (arrayed waveguide grating) and an interleaver. The wavelength multiplexing separation filter disclosed in patent document 3 realizes a wavelength multiplexing and separating filter by employing an AWG as a wavelength multiplexer/demultiplexer, and overlapping a plurality of pieces of light to which wavelength separation has been performed.

In addition, patent document 4 describes a structure of a high-frequency generator made by combining a frequency branching filter and an optical switch. Patent document 5 describes a structure with which spectrally separated light rays are multiplexed by a star coupler in a light wavelength multiplexing apparatus.

PRIOR ART DOCUMENT

Patent Document

[Patent document 1] Japanese Patent Application Laid-Open No. 2009-095019 (FIG. 2)
[Patent document 2] Japanese Patent Application Laid-Open No. 2008-203508 (FIG. 2)
[Patent document 3] Japanese Patent Application Laid-Open No. 2009-210841 (FIG. 4)
[Patent document 4] Japanese Patent Application Laid-Open No. 2009-004858 (FIG. 1)
[Patent document 5] Japanese Patent Application Laid-Open No. 1997-233052 (FIG. 11)

[Patent document 6] Japanese Patent Application Laid-Open No. 2002-368699 (paragraph [0011]-[0013])

[Patent document 7] Republication patent No. WO2006/008873 official bulletin (paragraphs [0095] and [0096], FIG. 9)

[Patent document 8] Japanese Patent Application Laid-Open No. 2004-212829 (FIG. 2)

[Patent document 9] Japanese Patent Application Laid-Open No. 2009-210788 (FIG. 5)

Non-Patent Document

[Non-patent document 1] "Spectrum-efficient and scalable elastic optical path network: architecture, benefits, and enabling technologies", IEEE Communications Magazine, vol. 47 and pp. 66-73, November, 2009 (USA)

[Non-patent document 2] "Highly programmable wavelength selective switch based on liquid crystal on silicon switching elements", Optical Fiber Communication Conference, 2006 and the 2006 National Fiber Optic Engineers Conference, OFC 2006, OTuF2 and March, 2006 (USA)

DISCLOSURE OF THE INVENTION

Technical Problems

However, a phase controlling device using LCOS disclosed in non-patent document 2 has a problem that its miniaturization is difficult because wavelengths are separated spatially. Also, the refractive index of LCOS is influenced by fluctuation of the orientation characteristics of liquid crystal strongly. For this reason, the optical characteristics of LCOS are sensitive to a temperature change. As a result, there is also a problem that a complicated control circuit for compensating a change in ambient temperature of LCOS is needed in order to control a wavelength to be selected stably. Further, LCOS has a problem that unpredictable phase fluctuation is generated to a light signal to be controlled due to fluctuation and noise of the alternating voltage that controls LCOS.

Further, a phase controlling device using LCOS also has a problem that it costs a lot. The reason is that an optical component with high accuracy such as a grating and LCOS are needed. Another reason is that it is required to mount those parts with high accuracy and perform complicated control.

In addition, a phase controlling device using LCOS has a problem that it has a large size. The reason of this is that it is necessary to use a relatively large part such as a grating and LCOS. Yet another reason is that, in order to increase the number of supporting ports by enhancing wavelength resolution, an optical path length in a module needs to be made long.

On the other hand, also in a structure disclosed in patent document 2 in which a 1×n coupler and n optical variable filters are combined, there is the following problems.

A structure in which a coupler and optical variable filters are combined has a problem that miniaturization is difficult as is the case with a phase controlling device using LCOS because wavelengths are separated spatially. In a structure in which a coupler and optical variable filters are combined, there is also a problem that loss is large when increasing the number of output ports n. In the case of a 1×40 coupler, about 16 dB of loss occurs only in the coupler. When loss of an optical variable filter is taken account of, total loss of a coupler and optical variable filters even reaches about 20 dB.

A further problem of the structure combining a coupler and an optical variable filter is that its operation speed is low. In a communication system, it is desired that a route switching time at the time of a failure is short. For example, 100 msec or below is desired. However, the switching time of a mechanical optical variable filter is longer than that, and its switching time is generally in the order of seconds. The reason of this is that a high-speed operation is difficult for a mechanical optical variable filter because a position of each part needs to be mechanically controlled with high accuracy.

A wavelength multiplexing separation filter disclosed in patent document 3 has a problem that it cannot make the filter characteristics variable. This is because the band characteristics of a wavelength multiplexing separation filter disclosed in patent document 3 is fixed by characteristics of an AWG and an interleaver.

Also, a wavelength multiplexing separation filter using an AWG and an optical interleaver disclosed in patent document 3 has a problem that flat wavelength characteristics cannot be obtained because a cross talk occurs. Due to a dimension error when producing an AWG, and wavelength dependency of an optical waveguide medium, there are cases where interference of light become insufficient in an exit side MMI (Multi Mode Interference) in the AWG. As a result, light of a wavelength that has not been designed may leak out to an output port. This is called a cross talk. For this reason, in order to reduce the cross talk, spatial separation of output ports of the exit side MMI of an AWG and setting up of a non-transmissive wavelength band (guard band) is performed. However, due to existence of the non-transmissive wavelength band, when transmission spectra from respective output waveguides of the AWG are overlapped, a large loss variation occurs between neighboring penetration peak wavelengths. FIG. 9 is a diagram showing a spectrum example of each of three neighboring outputted light beams of an AWG. FIG. 10 is a diagram showing a spectrum when coupling three output ports of an AWG by a 3×1 coupler. As it is clear from FIG. 10, loss of an AWG is fluctuating greatly by a wavelength. That is, by overlapping of light beams indicated by patent document 3, enough flat characteristics cannot be realized due to existence of a guard band.

When a guard band is set up in an AWG, a wavelength corresponding to the guard band cannot be used for communication. For this reason, frequencies which can be used in a wavelength multiplexing separation filter disclosed in patent document 3 are limited by existence of a guard band. Therefore, a wavelength multiplexing separation filter disclosed in patent document 3 also has a problem that the frequency efficiency might fall even when the OFDM technology is used.

Thus, the technologies disclosed in non-patent documents 1 and 2 and patent documents 2 and 3 have a problem that they cannot realize a multiplexer/demultiplexer that has high utilization efficiency of a frequency, has flat wavelength characteristics in a transmission band, is of low cost, is of a small size, and has a variable wavelength and band.

A high frequency producing device disclosed in patent document 4 is a device relating to a structure in which only two waves are chosen from inputted higher harmonic waves to make the two be multiplexed. Further, patent document 5 is a document related to a structure in which spectrally separated light rays are multiplexed by a star coupler. The technologies described in patent document 4 and patent document 5 are not ones disclosing a structure for settling the above-mentioned problems about a multiplexer/demultiplexer and a filter disclosed in non-patent documents 1 and 2 and patent documents 2 and 3. In addition, even if the technologies disclosed in patent document 4 and patent document 5 are combined with those of patent documents 1-3 and non-patent documents 1 and 2, a multiplexer/demultiplexer which settles all the above-mentioned problems cannot be composed.

An object of the present invention is to provide a technology for realizing a multiplexer/demultiplexer that has high utilization efficiency of a frequency, has flat wavelength characteristics in a transmission band, is of low cost, is of a small size, and has a variable wavelength and a band.

Technical Solution

A multiplexer/demultiplexer of the present invention includes: a first light branching means for branching inputted light into a plurality of pieces of light and outputting said branched pieces of light; a plurality of light wavelength separating means for separating and outputting light outputted from said first light branching means for each of predetermined frequency bands; and an optical coupling means for making outputs having different pieces of said frequency bands among outputs from said light wavelength separating means gather with each other to output said gathered outputs.

A multiplexing/demultiplexing method of the present invention includes the steps of: branching inputted light into a plurality of pieces of light, and outputting said branched plurality of pieces of light; separating said branched and outputted plurality of pieces of light for each of predetermined frequency bands and outputting said separated light; and, among said separated and outputted outputs, gathering outputs having ones of said frequency bands different from each other and outputting said gathered outputs.

Advantageous Effect of the Invention

The present invention has an effect that a multiplexer/demultiplexer in which a transmission wavelength and a transmission bandwidth are variable, wavelength characteristics of a transmission band is flat, and improvement of the utilization efficiency of a frequency is possible can be realized in a small size and with a low price.

BEST MODE FOR CARRYING OUT THE INVENTION

First Exemplary Embodiment

Next, the first exemplary embodiment of the present invention will be described in detail with reference to a drawing.

Figure 1:
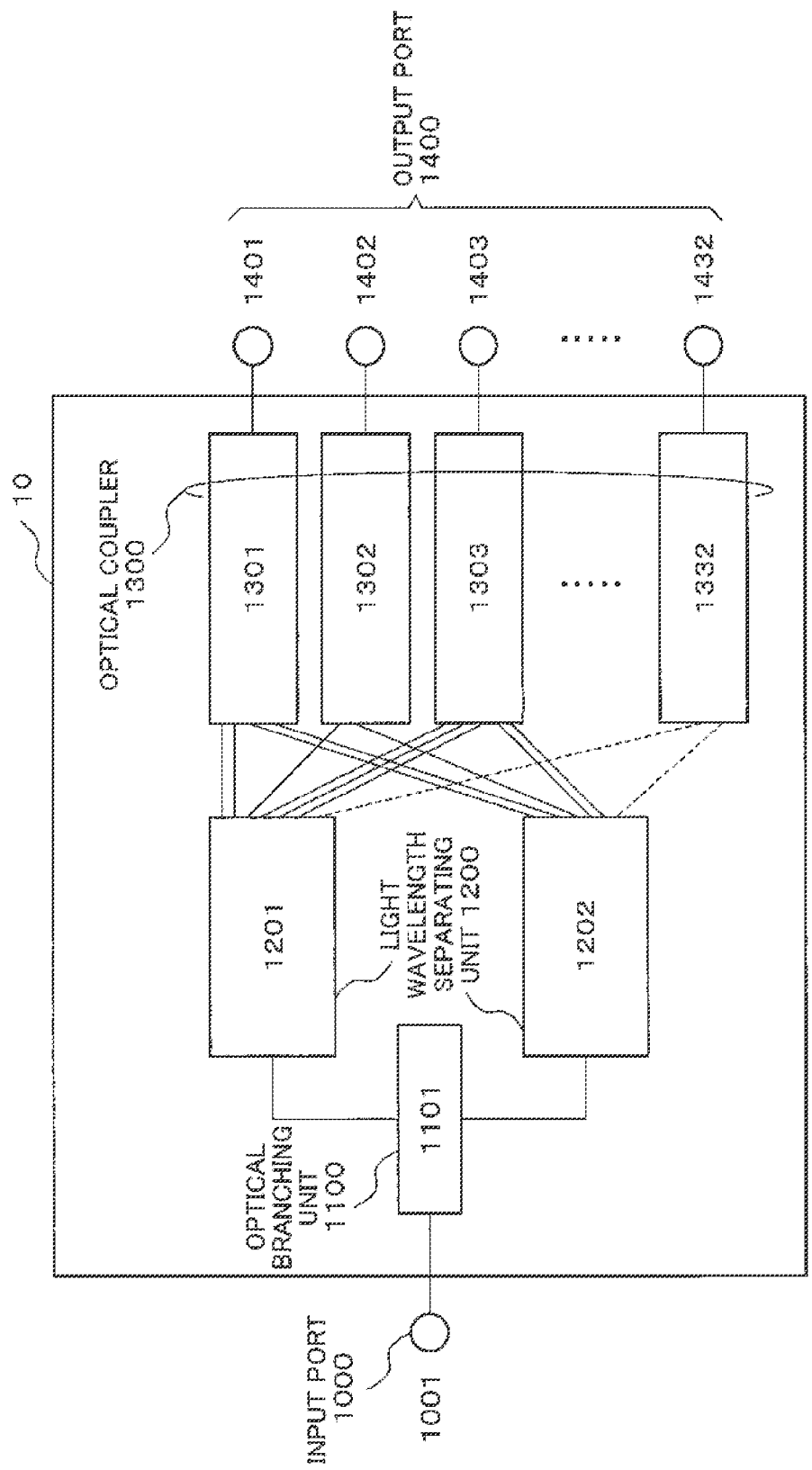
FIG. 1 is a diagram showing a first exemplary embodiment of a multiplexer/demultiplexer of the present invention.

FIG. 1 is a diagram showing the first exemplary embodiment of a multiplexer/demultiplexer of the present invention.

In FIG. 1, an optical branching unit 1100 is an optical splitter including a PLC (Planar Lightwave Circuit) of 1×2. The number of light wavelength separating units 1200 $p$ is 2, and each unit is a 1×40 PLC base AWG capable of separating 40 channels at 100 GHz intervals. A light wavelength separating unit 1201 is a device which can select and separate channels conforming to ITU-T (International Telecommunication Union Telecommunication Standardization Sector) grids. The transmission center wavelength of a light wavelength separating unit 1202 is shifted by a half cycle relative to that of the light wavelength separating unit 1201. That is, the transmission center frequency of the light wavelength separating unit 1201 and the transmission center frequency of the light wavelength separating unit 1202 shift from each other by 50 GHz. Optical couplers 1300 are optical couplers of 5×1 of a PLC base.

A structure of FIG. 1 realizes cost reduction by using only two AWGs that are expensive. In addition, it has the following two advantages as a result of fixing the cycles of a plurality of light wavelength separating units 1200 and making the cycles be matched.

The first advantage is that it is possible to reduce cost. The reason of this is that the design of the light wavelength separating units 1201 and 1202 can be made to be common by making the cycles be matched, and as a result, the light wavelength separating units 1201 and 1202 can be produced in a structure similar to each other.

The second advantage is that it is advantageous to realizing a wider broadband of a multiplexer/demultiplexer. In order to realize wavelength division characteristics in a large-bandwidth of 40 nm pass band or more, for example, it is necessary for filters of a light wavelength separating unit to make the cycles be matched with each other at high accuracy in wavelength characteristics. By using AWGs for which design is made to be common, it becomes easy to make cycles of the wavelength characteristics identical.

In FIG. 1, the optical branching unit 1100, the light wavelength separating units 1200 and the optical couplers 1300 are connected using optical fibers. The optical fibers between the light wavelength separating units 1200 and the optical couplers 1300 are connected so that the wavelengths selected in the light wavelength separating units 1201 and 1202 may lie adjacent to each other.

As above, the structure of the multiplexer/demultiplexer shown in FIG. 1 has been described in detail. Meanwhile, the structure and operations of each component in this figure are known well by a person skilled in the art. Accordingly, detailed description of each component will be omitted.

A channel interval and the number of channels of the light wavelength separating units 1200 depend on the optical communication system that is used. Accordingly, the channel interval and the number of channels of the light wavelength separating units 1200 may be changed according to need. For example, the channel interval may be one of 25 GHz, 50 GHz and 200 GHz. Also, the number of channels should be selected according to the specification of an optical communication system to be used such as 10 channels, 20 channels and 80 channels.

Further, the number of pieces of coupling of the optical couplers 1200 should also be selected according to a wavelength bandwidth necessary for an optical communication system to be used.

Yet further, although it has been supposed that devices whose basic structure is a PLC is used as each part, a structure besides PLC is also possible as each device. For example, a compound semiconductor, silicon and polymer may be used as the material.

[Description of Operations]

Next, operations for band varying and wavelength varying of a multiplexer/demultiplexer of the first exemplary embodiment will be described.

Figure 2:
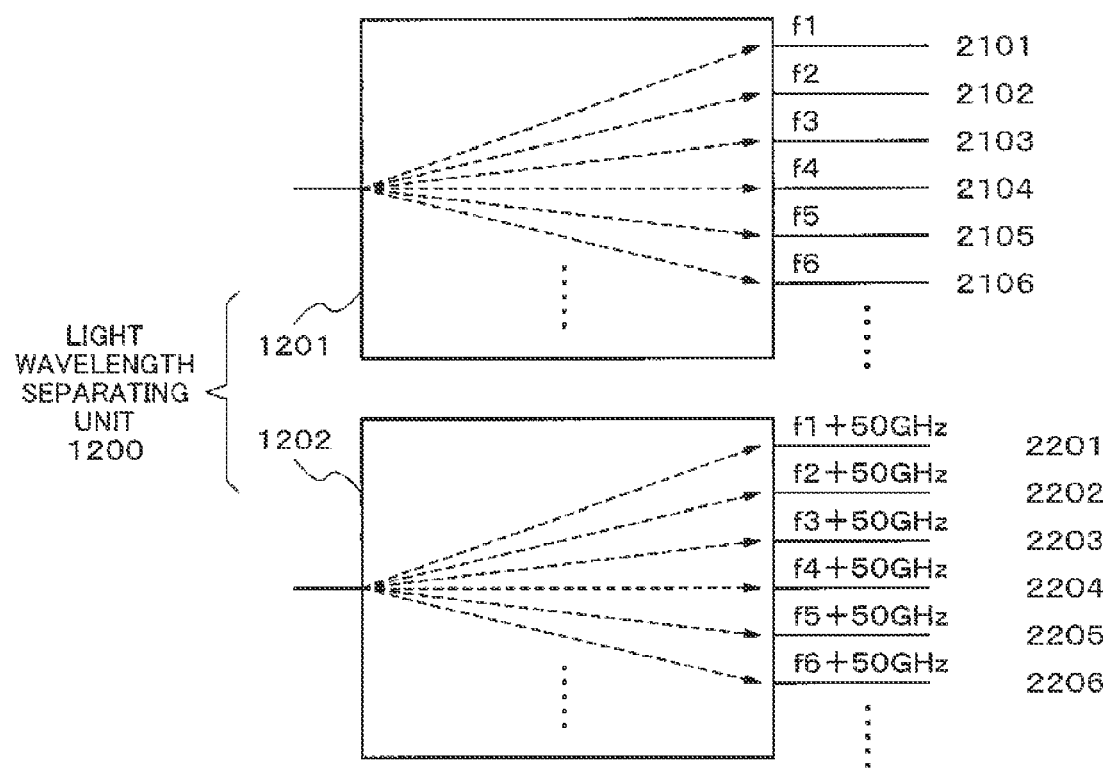
FIG. 2 is a diagram showing relation between output side ports of a light wavelength separating unit and corresponding frequencies in the first exemplary embodiment.

A multiplexer/demultiplexer 10 of the first exemplary embodiment shown in FIG. 1 can make band and wavelength characteristics variable by selecting an output side port of the light wavelength separating units 1200 connected with the optical couplers 1300. It will be described specifically below. FIG. 2 is a diagram showing relation between an output side port of the light wavelength separating units 1200 and a frequency corresponding to it in the first exemplary embodiment of the present invention. As shown in FIG. 2, output ports of the light wavelength separating unit 1201 are labeled as a port 1-1 (2101 in FIG. 2), a port 1-2 (2102) and so on in the order of energy from lowest side (long wavelength side) to highest side in its wavelength selection characteristics. On the other hand, output ports of the light wavelength separating unit 1202 are also labeled as a port 2-1 (2201), a port 2-2 (2202) and so on from the low energy side similarly. It is supposed that frequencies selected at the port 1-1 and the port 1-2 and so on are f1, f2, . . . , respectively.

When making light of f5 of FIG. 2 be outputted at an output port 1403 of the multiplexer/demultiplexer 10 shown in FIG. 1, one of input ports of an optical coupler 1303 and a port 1-5 (2105) of the light wavelength separating unit 1201 are connected first. As mentioned above, light of the frequency f5 is outputted from the port 1-5. Further, when making the transmission band of the output port 1403 be expanded into frequencies located before and behind f5, ports of center wavelengths neighboring f5 are connected from the light wavelength separating units 1201 and 1202 according to a band to be needed. For example, when a transmission band of 100 GHz is needed, a port 2-4 (2204) and a port 2-5 (2205) of the light wavelength separating unit 1202 are connected with remaining ports of the optical coupler 1303. As a result, a transmission band ranging from at least 50 GHz before f5 to at least 50 GHz behind f5 is obtained.

Figure 3:
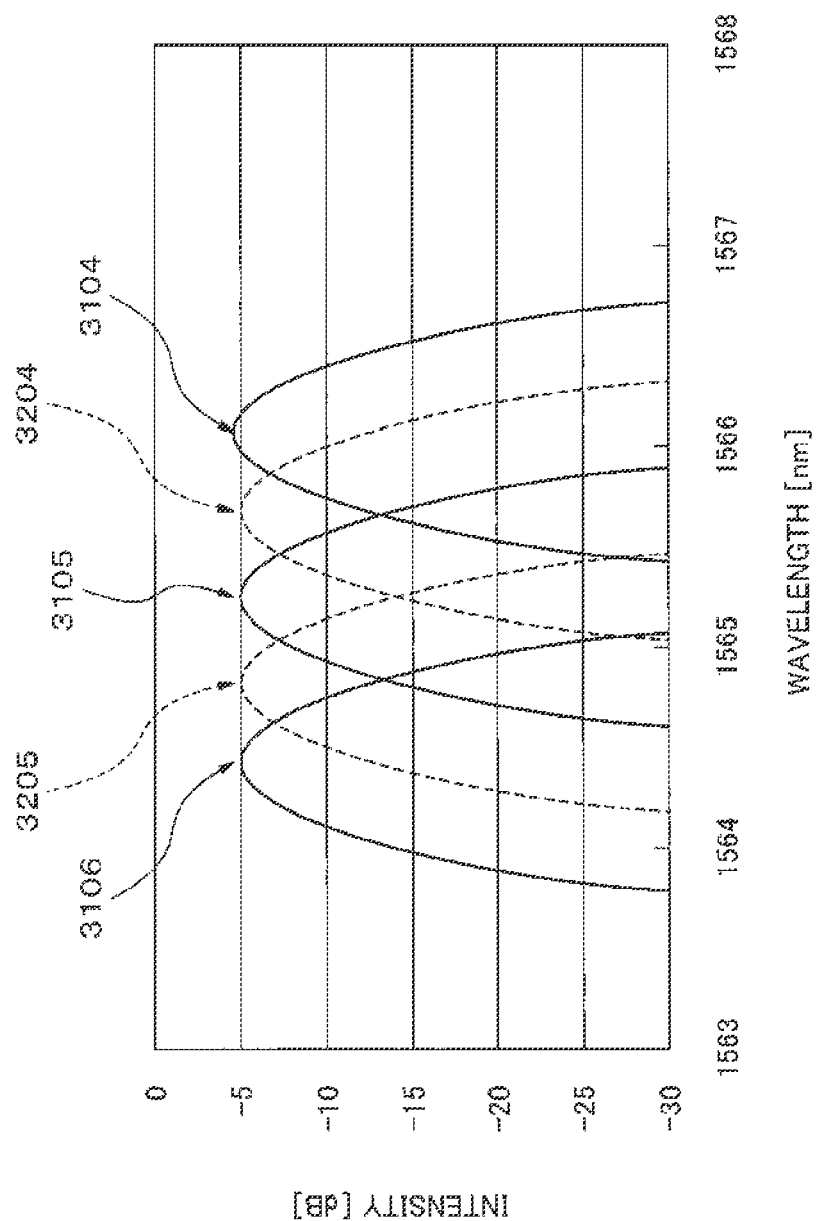
FIG. 3 is a diagram showing an example of transmission characteristics of a light wavelength separating unit as a single body.
Figure 4:
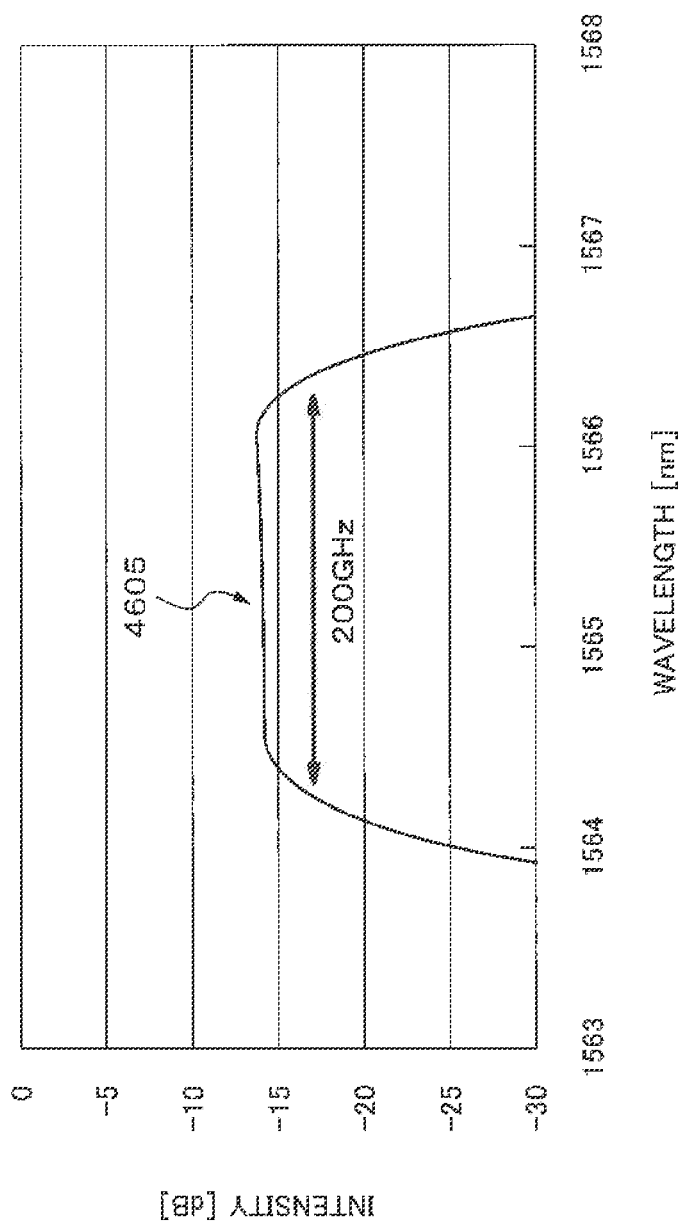
FIG. 4 is a diagram showing an example of wavelength selection filter characteristics through an output port 1403.

When it is required to expand a transmission band into 200 GHz, a port 1-4 (2104) and a port 1-6 (2106) of the light wavelength separating unit 1201 should further be connected to remaining ports of the optical coupler 1303 additionally. FIG. 3 is a diagram showing an example of transmission characteristics of a light wavelength separating unit as a simple body. In FIG. 3, wavelength selection filter characteristics of the ports 1-4 to 1-6 and the port 2-4 and the port 2-5 of a light wavelength separating unit as a simple body in a single-pass are indicated as 3104-3106, 3204 and 3205, respectively, as an example. FIG. 4 is a diagram which indicates an example of wavelength characteristics of a multiplexer/demultiplexer through the output port 1403 as 4605. FIG. 4 indicates wavelength characteristics of a multiplexer/demultiplexer when the ports of the light wavelength separating units shown in FIG. 3 are connected to inputs of the optical coupler 1303. Thus, by selecting ports of the light wavelength separating units connected to the optical coupler 1303 appropriately, a multiplexer/demultiplexer of the first exemplary embodiment can realize variable-band characteristics and variable-wavelength characteristics.

Further, the multiplexer/demultiplexer 10 can set a plurality of output ports according to the number of ports of the output side of the light wavelength separating units 1200. For this reason, the multiplexer/demultiplexer 10 can realize a multiplexer/demultiplexer equipped with 10 or more output ports easily. For example, it is also possible for a multiplexer/demultiplexer of the first exemplary embodiment to have a structure equipped with beyond 40 or 80 output ports so that all channels of C band and L band that have been standardized in ITU-T may be covered.

Also, in the structure of the multiplexer/demultiplexer 10, insertion loss is suppressed low. For example, the insertion loss of a multiplexer/demultiplexer supporting 40 ports, which is made by combining a 1×40 coupler and 40 mechanical band-and-wavelength-variable filter of 1×1, is about 20 dB as it has been mentioned above. In contrast, in the structure of this exemplary embodiment, the loss is small and it is about 14 dB as shown in FIG. 4 even if the number of ports is 40 or more. The detail of this loss of 14 dB is: about 3 dB in the optical branching unit 1100; about 3 dB in the light wavelength separating unit; and about 7 dB in the optical couplers 1300.

Meanwhile, although not indicated in FIG. 1, a phase adjuster may be arranged between the light wavelength separating units 1200 and the optical couplers 1300. By using a phase adjuster, it becomes possible to set a phase of light which enters each of the optical couplers 1300 to an optimum value to suppress interference in each optical path. The filter characteristics become flatter and low loss due to the suppression of interference in each optical path. The reason of this is that transmission characteristics of light outputted from an optical coupler becomes of a shape made by overlapping the transmission characteristics of each optical path. The structure in which the phase adjuster is arranged will be described in detail in the fourth exemplary embodiment.

The multiplexer/demultiplexer 10 is composed such that the light wavelength separating units 1200 and the optical couplers 1300 are connected by optical fibers and an optical path is changed by modifying the connection of the optical fibers manually. However, the modification of the connection between the light wavelength separating units 1200 and the optical couplers 1300 can be performed using an optical switch.

Incidence of light to the multiplexer/demultiplexer 10 is possible not only from the side of an input port 1000 but also from the side of output ports 1400. The multiplexer/demultiplexer 10 operates as a multiplexer when the light is inputted from the input port 1000, and as a demultiplexer when the light is inputted from the output ports 1400.

As it has been described above, the multiplexer/demultiplexer 10 described in the first exemplary embodiment can vary a transmission wavelength and a transmission bandwidth, has flat wavelength characteristics in a transmission band, and can improve the utilization efficiency of a frequency. Also, a multiplexer/demultiplexer described in the first exemplary embodiment is composed without using LCOS and a grating, or a fiber collimator and the like. For this reason, a small-sized and low-price multiplexer/demultiplexer is realized.

Further, in the multiplexer/demultiplexer 10 described in the first exemplary embodiment, the characteristics of each light wavelength separating unit are set such that the cycles of transmission wavelength bands is made to be constant, and the peak wavelengths of the respective transmission wavelength bands are shifted by one p-th of the cycle. As has been described in FIG. 3 and FIG. 4, by inputting outputs of two light wavelength separating units to an identical optical coupler so that transmission bands may sit continuously, wavelength characteristics of high flatness can be realized at each output port in a multiplexer/demultiplexer described in the first exemplary embodiment.

Also, the multiplexer/demultiplexer 10 described in the first exemplary embodiment can realize low loss and planarization of a transmission band by further mounting a phase adjustment unit.

The multiplexer/demultiplexer 10 described in the first exemplary embodiment can realize further miniaturization and cost reduction of a device by integrating function units constituting the multiplexer/demultiplexer using a PLC structure or the like.

Figure 11:
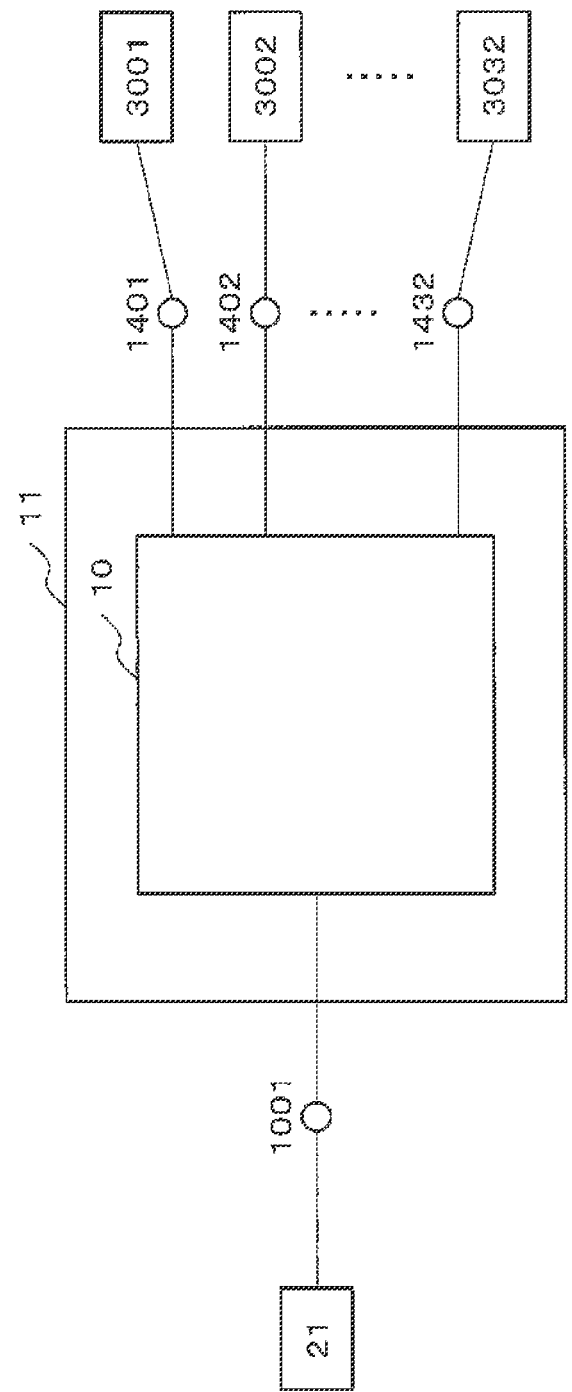
FIG. 11 is a diagram showing a structure of an optical network node using a multiplexer/demultiplexer described in the first exemplary embodiment.

The multiplexer/demultiplexer 10 described in the first exemplary embodiment can be employed as an optical network node. FIG. 11 is a diagram showing a structure of an optical network node 11 that uses the multiplexer/demultiplexer 10 described in the first exemplary embodiment. In FIG. 11, it is supposed that the input of the optical network node 11 is an input port 1001, and the outputs of the optical network node are output ports 1401-1432. The input port 1001 receives a light signal from an optical fiber communication path 21. Transmitter/receivers 3001-3032 which are transmission destinations of a light signal are connected to the output ports 1401-1432. As mentioned above, a light signal corresponding to a wavelength band of each output port is outputted to the output ports 1401-1432. Accordingly, the multiplexer/demultiplexer 10 separates light signals received from the optical fiber communication path 21 in a manner corresponding to each wavelength band of the output ports 1401-1432, and outputs them to different one of the transmitter/receivers 3001-3032, respectively. Transmission of a signal from the transmitter/receivers 3001-3032 to the optical fiber communication path 21, which is a reverse operation, is also possible. By such operations, the multiplexer/demultiplexer 10 operates as the optical network node 11.

It is possible for the multiplexer/demultiplexer 10 provided in the optical network node 11 to make a light signal be transmitted also in a direction from the output ports 1400 toward the input port 1000. That is, light signals which the transmitter/receivers 3001-3032 have transmitted may be inputted from the output ports 1401-1432 to the multiplexer/demultiplexer 10. In this case, the optical couplers 1300 provided in the multiplexer/demultiplexer 10 shown in FIG. 1 performs wavelength multiplexing of light inputted from the output ports 1401-1432 for each wavelength band, and outputs the multiplexed light to the light wavelength separating units 1200. The light wavelength separating units 1200 performs further wavelength multiplexing of light outputted from the optical couplers 1300, and outputs the further multiplexed light to an optical branching unit 1101. The optical branching unit 1101 combines light outputted from the light wavelength separating units 1200, and outputs the combined light to the optical fiber communication path 21 via the input port 1001.

Meanwhile, the minimum configuration for deriving the effect of the first exemplary embodiment is a structure in which there is only one output port in FIG. 1. That is, as it has been described using FIGS. 2-4, a port of the light wavelength separating units 1200 that outputs a center wavelength of a band to be desired to be transmitted is connected to an input port of the optical coupler 1303, for example. Then, according to a needed band, ports of center wavelengths neighboring the center wavelength f5 are connected from the light wavelength separating units 1201 and 1202. As a result, a multiplexer/demultiplexer having the desired band can be realized. Meanwhile, in a multiplexer/demultiplexer of this exemplary embodiment, it is supposed that a device of a structure in which only one input port and one output port exist is also called a multiplexer/demultiplexer.

A plurality of transmission wavelength bands may be set to one output port. Setting of each wavelength band can be realized by performing the procedure mentioned above for outputting light of the frequency f5 to the output port 1403 of the optical multiplexer/demultiplexer 10 for a plurality of wavelengths. That is, when a plurality of transmission wavelength bands are set to one output port, in each of the transmission wavelength bands, the procedure for selecting and connecting ports of center wavelengths having transmission bands neighboring each other from the light wavelength separating units 1201 and 1202 should be carried out.

Second Exemplary Embodiment

Figure 5:
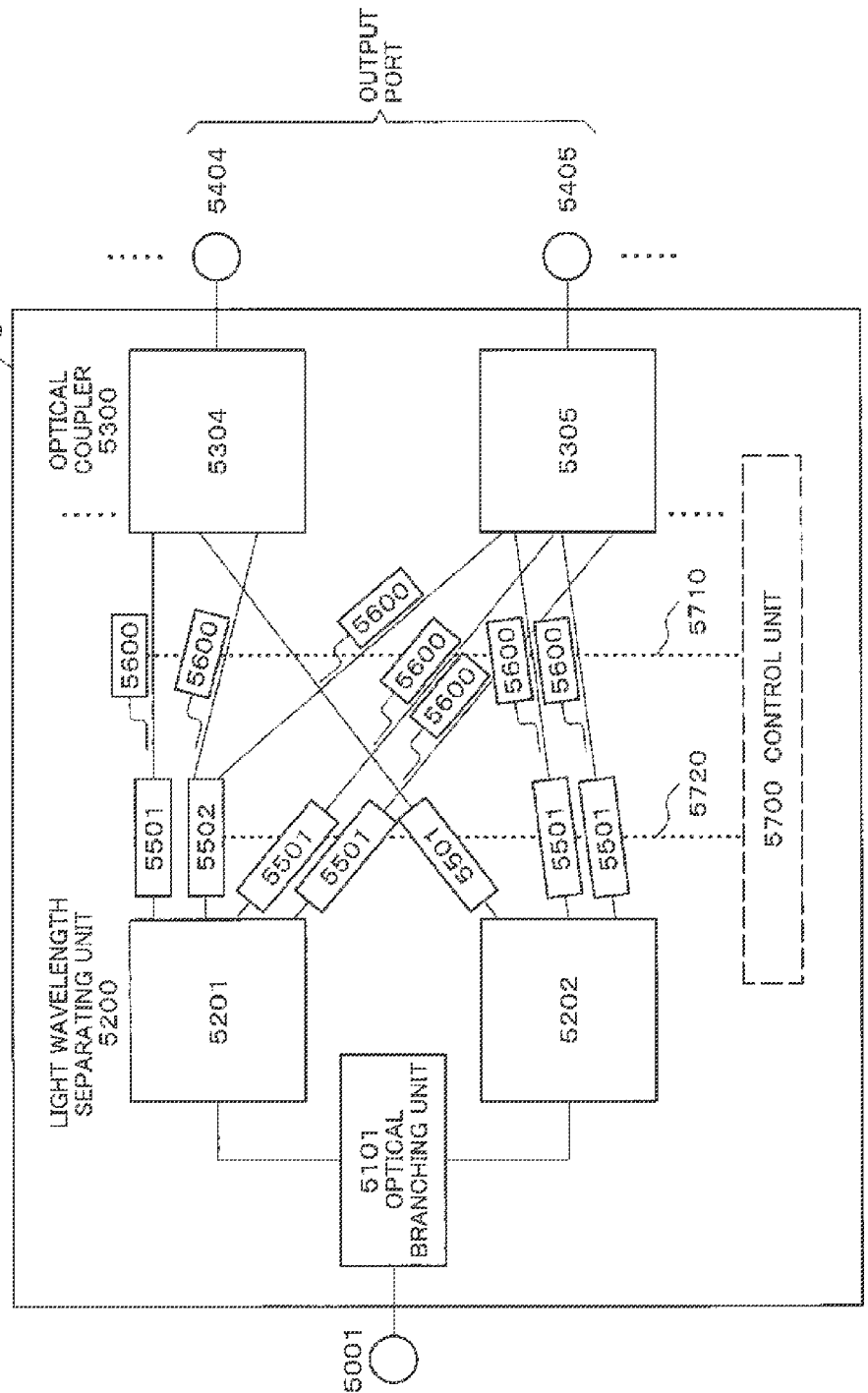
FIG. 5 is a diagram showing a structure of a second exemplary embodiment of a multiplexer/demultiplexer of the present invention.

Next, the second exemplary embodiment of the present invention will be described. The basic configuration of a multiplexer/demultiplexer of the second exemplary embodiment is the same as that of the first exemplary embodiment. However, a multiplexer/demultiplexer of the second exemplary embodiment enables to eliminate the use of the guard band by giving the structure for varying a band with a further twist. FIG. 5 is a diagram showing a structure of the second exemplary embodiment of a multiplexer/demultiplexer of the present invention. Compared with the multiplexer/demultiplexer 10 shown in FIG. 1, a multiplexer/demultiplexer 50 shown in FIG. 5 differs in a point that an optical variable attenuator 5501 or an optical branching unit 5502 of 1×2 is arranged between light wavelength separating units 5200 and optical couplers 5300.

In the multiplexer/demultiplexer 50 shown in FIG. 5, light inputted from an input port 5001 is divided into 2 in an optical branching unit 5101 and inputted to wavelength separating units 5201 and 5202. Outputs of the wavelength separating units 5201 and 5202 are connected to optical couplers 5304 and 5305.

Here, when there is a transmission band of the light wavelength separating units 5200 that is selected in common within the bands of the wavelength characteristics of two different output ports 5404 and 5405, the optical branching unit 5502 is arranged on the output port of the transmission band of the light wavelength separating units 5200. As a result, it becomes possible for a transmission band selected in common by the output ports 5404 and 5405 (a port where the optical branching unit 5502 is connected in FIG. 5) to be connected to both of the optical couplers 5304 and 5305 from the light wavelength separating units 5200.

Here, loss in a route where the optical branching unit 5502 has been inserted increases by loss of the optical branching unit 5502. For this reason, the strength of a light signal inputted to the optical couplers 5304 and 5305 falls only for a light signal which has passed a route where the optical branching unit 5502 has been inserted. Accordingly, in the multiplexer/demultiplexer 50, in order to compensate intensity difference of light signals in the optical couplers 5304 and 5305, the optical variable attenuator 5501 is arranged in a route where the optical branching unit 5502 is not inserted. An attenuation amount of the optical variable attenuator 5501 is set based on loss in the optical branching unit 5502.

Then, in the multiplexer/demultiplexer 50, a reception unit 5600 arranged in each route monitors the level of a light signal inputted to the optical couplers 5300. The reception unit 5600 notifies a control unit 5700 of the level of a monitored light signal as optical level information via control lines 5710 and 5720. The control unit 5700 transmits a signal for controlling attenuation of an optical variable attenuator to each optical variable attenuator via the control line 5720 based on the optical level information which it is notified from the reception unit 5600. Here, the control unit 5700 may control an attenuation amount of the optical variable attenuator so that the levels of the light signals monitored by each reception unit 5600 may become equivalent to each other. However, a procedure for controlling an attenuation amount of an optical variable attenuator is not limited to this.

Figure 6:
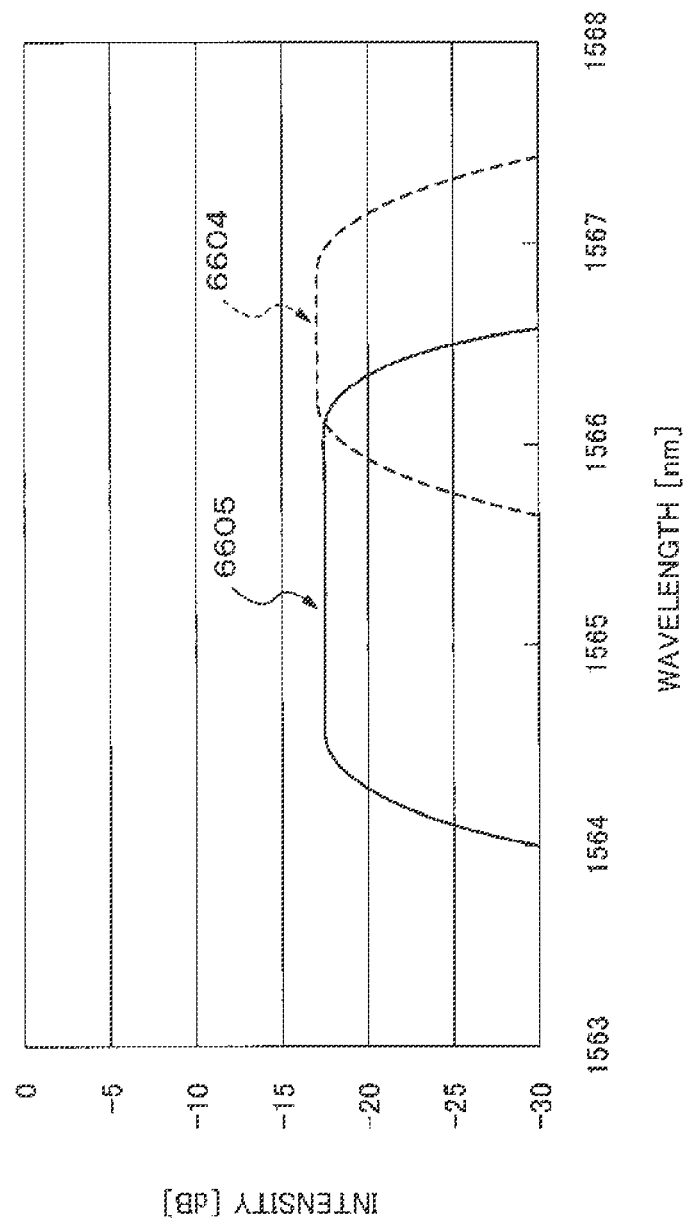
FIG. 6 is a diagram showing transmission characteristics 6604 and 6605 in routes through an output port 5404 and an output port 5405.

FIG. 6 is a diagram showing transmission characteristics 6604 and 6605 in the routes through the output port 5404 and the output port 5405. The transmission characteristics 6604 and 6605 of the two output ports 5404 and 5405 are flat within the transmission bands. There is not a dip between the loss characteristics of the transmission bands of the two output ports 5404 and 5405, and that is, a wavelength that cannot be used due to a guard band does not exist.

In coherent communication, an electric signal is extracted by making a light signal of a wavelength that has been transmitted and a local oscillation light source interferes with each other. On this occasion, electric signals which occur by interference of a light signal besides the target wavelength and the local oscillation light source can be removed by an electric filter. Accordingly, even if there is an overlap of transmission characteristics 6604 through the output port 5404 and the transmission characteristics 6605 through the output port 5405 shown in FIG. 6, and a light signal within the overlapped band shows a light signal leak to a neighbored output port, it does not have an influence on the transmission characteristics of the communication path through the respective output ports. That is, even in coherent communication, the multiplexer/demultiplexer 50 also has the effect that frequency characteristics can be made highly effective.

As it has been described above, as is the case with a multiplexer/demultiplexer of the first exemplary embodiment, the multiplexer/demultiplexer 50 of the second exemplary embodiment can make a transmitted wavelength and a transmission bandwidth variable, has flat wavelength characteristics of a transmission band, and can improve the utilization efficiency of a frequency. Also the multiplexer/demultiplexer 50 of the second exemplary embodiment does not require LCOS and a grating or a fiber collimator and the like. As a result, a small size and low-price multiplexer/demultiplexer is realized.

In addition to the above mentioned effects, the multiplexer/demultiplexer 50 described in the second exemplary embodiment also makes it possible to give an overlap to spectra from each output port. As a result, it becomes possible to make a guard band be included in a transmission band. As a result, the multiplexer/demultiplexer 50 described in the second exemplary embodiment can provide an optical network node capable of communication of high frequency utilization efficiency. As a result, also in an optical communication system which adopts the OFDM technology, the multiplexer/demultiplexer 50 of the second exemplary embodiment can realize an optical network node which can utilize a frequency effectively.

Further, the multiplexer/demultiplexer 50 described in the second exemplary embodiment can control an attenuation amount of an optical variable attenuator using a control unit automatically. Accordingly, the multiplexer/demultiplexer 50 also has the effect that, even if the level of an inputted light signal fluctuates, it can suppress influence of the fluctuation of the light signal level on the characteristics of an optical communication system connected after the multiplexer/demultiplexer.

As modification of the second exemplary embodiment shown in FIG. 5, a structure having the optical branching unit 5502 in all paths is also possible. Or, the structure of FIG. 5 may be a structure which arranges the optical branching unit 5502 and the optical variable attenuator 5501 that is arranged in series with the optical branching unit 5502 in all paths. By arranging the optical branching unit 5502 in all paths, it becomes possible to use an optional wavelength band in common in the optical couplers 5304 and 5305.

Third Exemplary Embodiment

Figure 7:
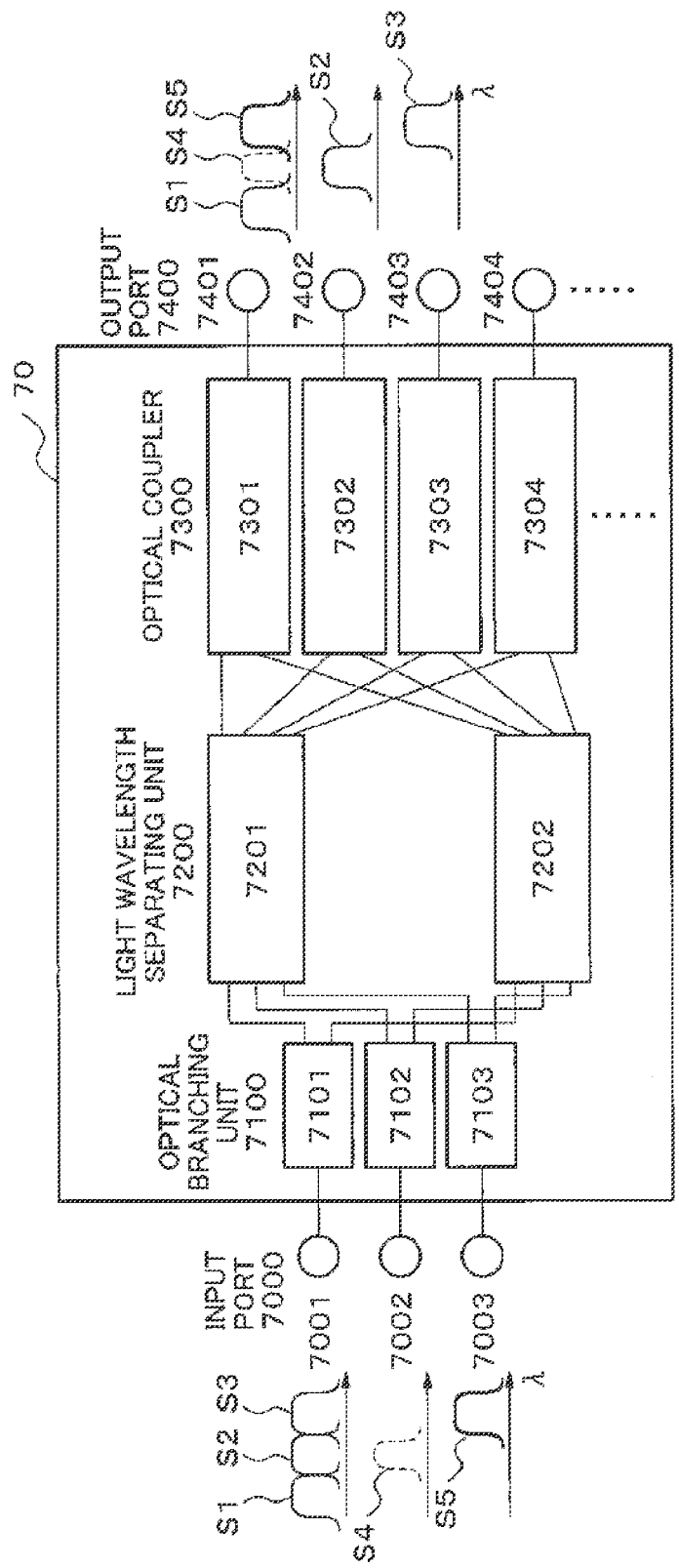
FIG. 7 is a diagram showing a structure of a third exemplary embodiment of a multiplexer/demultiplexer of the present invention.

Next, a multiplexer/demultiplexer of the third exemplary embodiment of the present invention will be described. Although the basic configuration of a multiplexer/demultiplexer 70 of the third exemplary embodiment is identical with the first and second exemplary embodiments, it also realizes colorlessness. FIG. 7 is a diagram showing a structure of the third exemplary embodiment of a multiplexer/demultiplexer 70 of the present invention. A multiplexer/demultiplexer 70 employs a Cyclic-AWG (c-AWG) having cyclic-wavelength characteristics as light wavelength separating units 7200. A c-AWG is a device which has a plurality of input ports, and, when an input port which inputs a WDM signal is changed, a wavelength outputted from an output port changes cyclically. The structure and details of the operation of an AWG equipped with cyclic-wavelength characteristics are disclosed in patent document 6, for example. According to the third exemplary embodiment, a case where the number of input ports of c-AWG is three ports will be described.

The multiplexer/demultiplexer 70 in FIG. 7 includes three PLC-based optical splitters (7101-7103) of 1×2 as optical branching units 7100. The light wavelength separating units 7200 are 3×40 c-AWGs of also a PLC structure capable of separating 40 channels with 50 GHz intervals. A light wavelength separating unit 7201 is a device which can select and separate a channel conforming to an ITU-T grid. A light wavelength separating unit 7202 is a device for which the peak of a transmitted wavelength is shifted by a half cycle (by 25 GHz in a frequency) relative to the light wavelength separating unit 7201. Optical couplers 7300 include 32 PLC structure 5×1 optical couplers. The relation between three input ports and 40 output ports of the light wavelength separating unit 7201 and the relation between three input ports and 40 output ports of the light wavelength separating unit 7202 are similar mostly between the two, and only a point that selected wavelengths from their output ports shift by 25 GHz from each other differs. An input port 1 of each of the light wavelength separating units is connected to an output port of the optical branching unit 7101 that is one optical branching unit. The other input ports are also connected to output ports of the remaining optical branching units 7102 and 7103 similarly.

The operation form of the multiplexer/demultiplexer 70 will be described. Light signals S1, S2 and S3 having wavelengths of λ1, λ2 and λ3, respectively, are inputted to an input port 7001. A signal S4 having a wavelength of λ2 is inputted to an input port 7002. A signal S5 having a wavelength of λ3 is inputted to an input port 7003. Here, it is supposed that the frequencies corresponding to the wavelengths λ1, λ2 and λ3 of the light signals S1-S5 become smaller successively in this order by 25 GHz each.

The light signals S1, S2 and S3 pass the light wavelength separating unit 7201 or 7202, and are outputted to the output ports 7401, 7402 and 7403. The wavelength of the light signal S4 is λ2, and is equal to that of the light signal S2.

While, in the light wavelength separating units 7201 and 7202, the light signal S4 is inputted to ports adjacent to those of the light signals S1-S3. By the function of a c-AWG, also in the output ports of the light wavelength separating unit 7201 or 7202, the light signal S4 is outputted from a port that is adjacent to that of the light signal S2 and is the same as that of the light signal S1. As a result, also in output ports 7400, the light signal S4 is outputted from an output port 7401 as is the case with the light signal S1. That is, when the light signal S2 is outputted from an output port 7402, the light signal S4 is outputted from the output port 7401.

The wavelength of the light signal S5 is λ3, and the wavelength is equal to that of the light signal S3. In the light signal S1 and the light wavelength separating units 7201 and 7202, the input port of the light signal S5 is separated from that of the light signal S3 by two ports. As a result, by the function of a c-AWG, the light signal S5 is outputted from the same port as the light signal S1 in the output ports of the light wavelength separating unit 7201 or 7202. The reason of this is that an output port of the light signal S1 is separated from that of the light signal S3 by two ports. As a result, in the output ports 7400, the light signal S5 is also outputted from the output port 7401 separated from the light signal S3 by two ports.

Accordingly, as it has been described in the first and second exemplary embodiments, the multiplexer/demultiplexer 70 described in the third exemplary embodiment also has a transmitted wavelength and a transmission bandwidth that are variable, has a transmission band with flat wavelength characteristics, and enables to improve the utilization efficiency of a frequency. The multiplexer/demultiplexer 70 of the third exemplary embodiment is composed without using LCOS and a grating or a fiber collimator and the like. For this reason, a small-size and low-price multiplexer/demultiplexer is realized.

In addition, the structure of the multiplexer/demultiplexer 70 enables to add the band-variable function having the effect described in the first and second exemplary embodiments to a WDM system that uses a c-AWG related to the present invention. That is, a multiplexer/demultiplexer of the third exemplary embodiment indicates an exemplary embodiment in which a multiplexer/demultiplexer of the present invention is applied to a multiplexer/demultiplexer which performs a colorless operation that is an operation to spectrally separate light signals of different wavelength bands by an identical AWG using c-AWG.

As is the case with the multiplexer/demultiplexers 10 and 50 of the first and second exemplary embodiments, it is also possible for the multiplexer/demultiplexer 70 to distribute and output inputted light signals for each transmission band of an output port.

Figure 12:
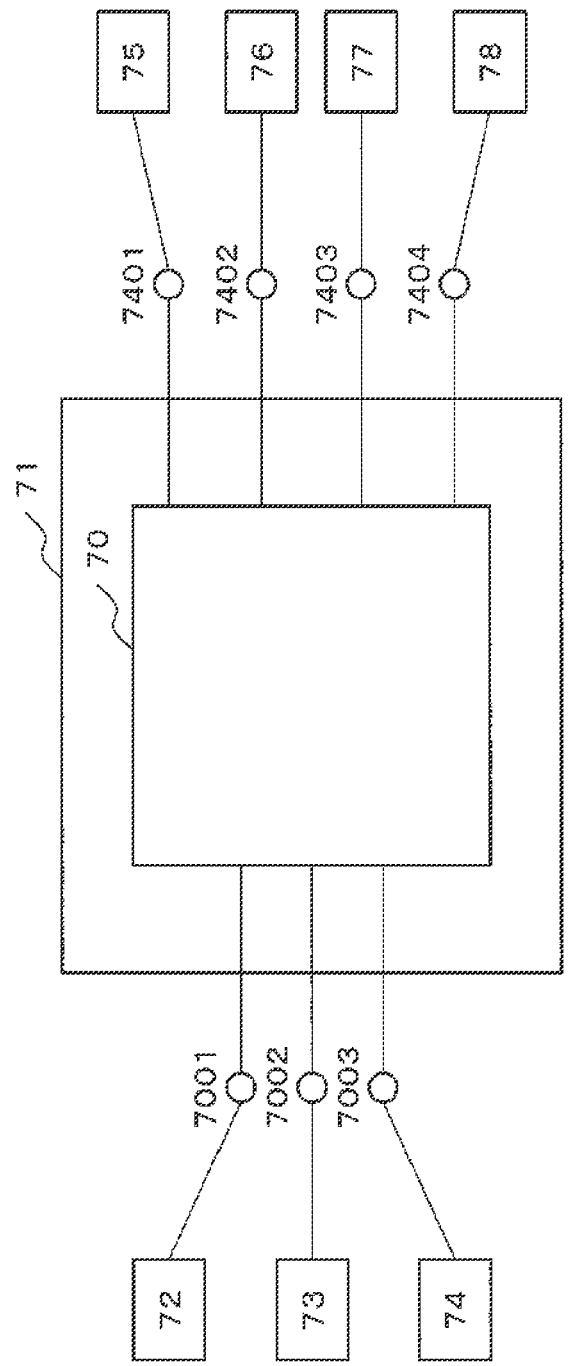
FIG. 12 is a diagram showing a structure of an optical network node using a multiplexer/demultiplexer described in the third exemplary embodiment.

FIG. 12 is a diagram showing a structure of an optical network node 71 using the multiplexer/demultiplexer 70 described in the third exemplary embodiment. Optical fiber communication paths 72-74 and transmitter/receivers 75-78 are connected to the optical network node 71. Light signals which have been transmitted through optical fiber communication paths 72-74 are inputted to ports 7001-7003 of the multiplexer/demultiplexer 70 of the optical network node 71. The light signals inputted to the input ports 7001-7003 are outputted to the output port 7401-7404 by the wavelength separation operation of the above-mentioned c-AWG and transmitted to the transmitter/receivers 75-78. By the cyclic function of c-AWG, it is possible to output signals of an identical wavelength that have been inputted from different input ports to different output ports independently from each other. Transmission of signals from the transmitter/receivers 75-78 to the optical fiber communication paths 72-74, which is a reverse operation, is also possible. By these operations, the multiplexer/demultiplexer 70 operates as the optical network node 71.

Fourth Exemplary Embodiment

Figure 8:
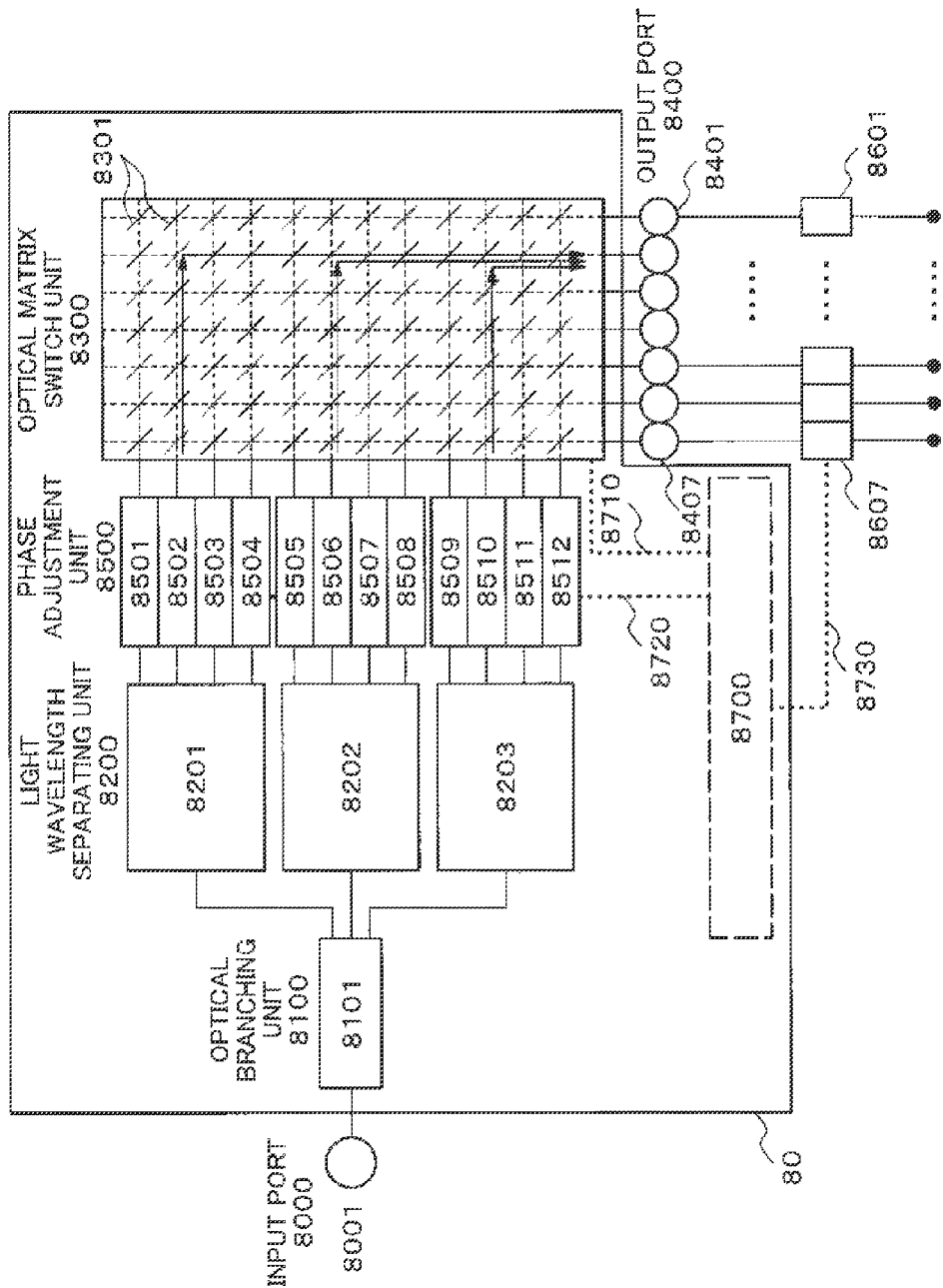
FIG. 8 is a diagram showing a structure of a fourth exemplary embodiment of a multiplexer/demultiplexer of the present invention.
Figure 9:
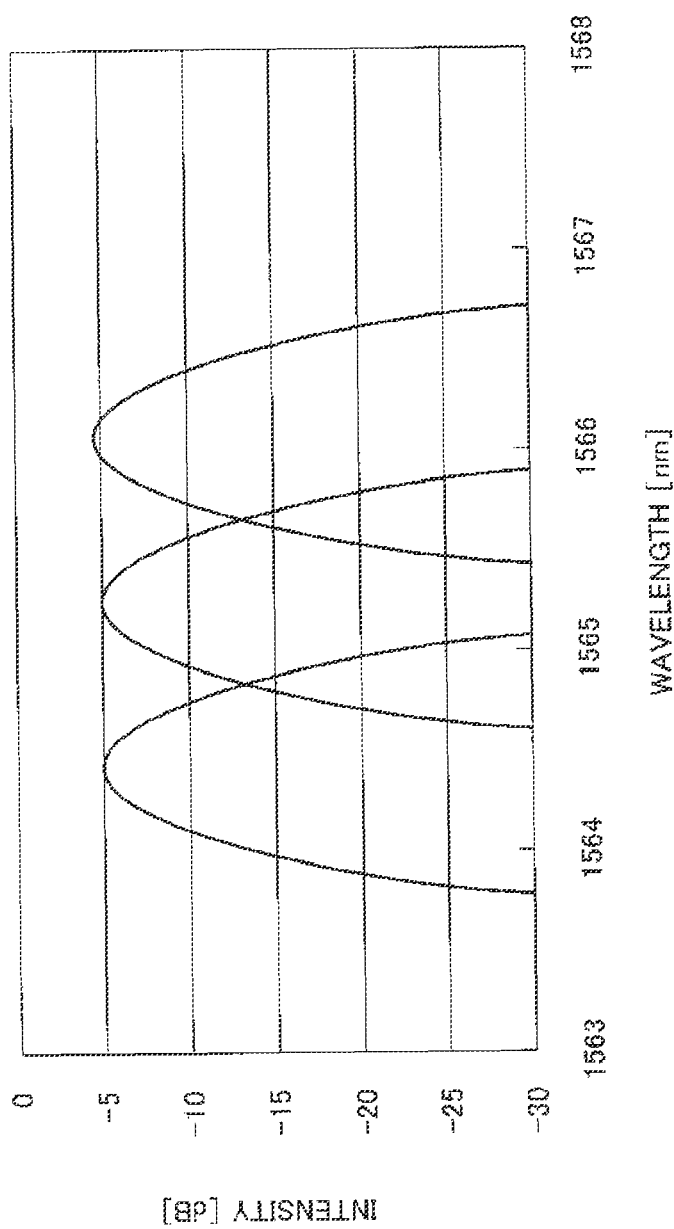
FIG. 9 is a diagram showing a spectral example of each of three neighboring outputted light beams of an AWG.
Figure 10:
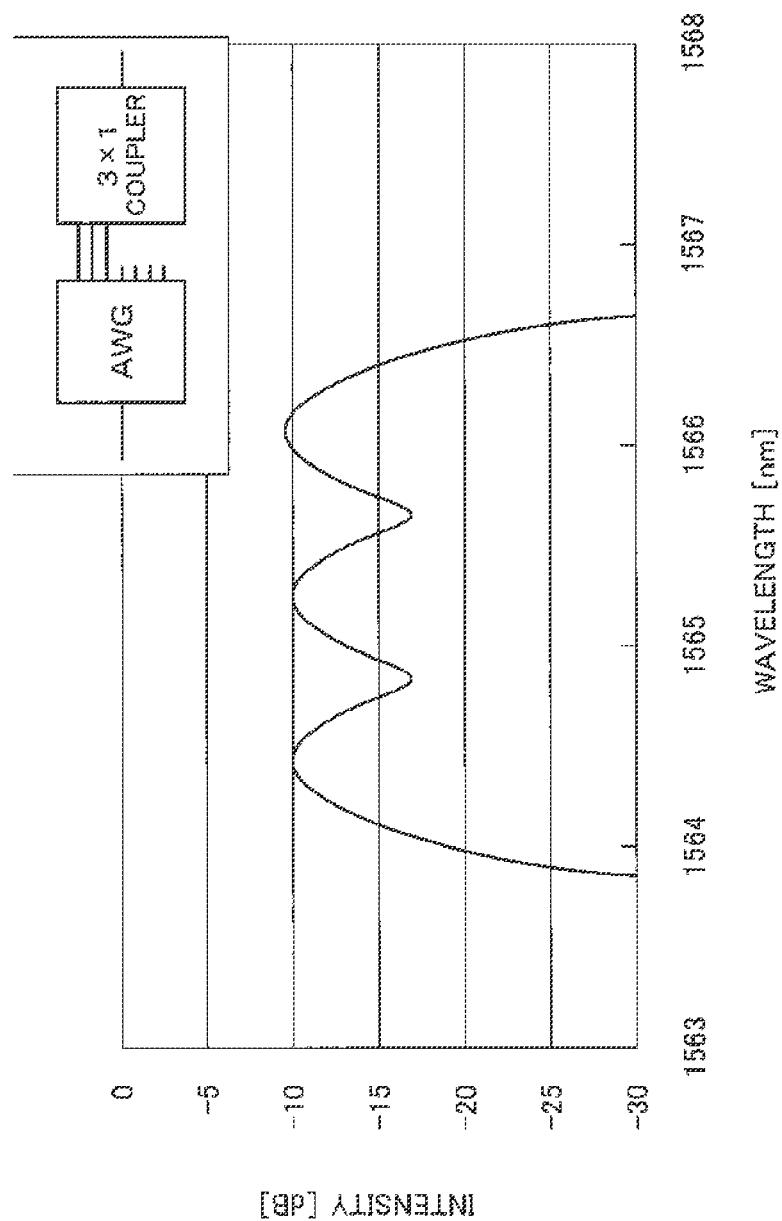
FIG. 10 is a diagram showing a spectrum when combining three output ports of an AWG by a 3×1 coupler.

FIG. 8 is a diagram showing a structure of the fourth exemplary embodiment of a multiplexer/demultiplexer of the present invention. A multiplexer/demultiplexer of the fourth exemplary embodiment employs optical matrix switch units 8300 as the optical couplers 1300 of a multiplexer/demultiplexer described in the first exemplary embodiment. As a result, a multiplexer/demultiplexer 80 of the fourth exemplary embodiment realizes remote control of wavelength characteristics and band characteristics.

The multiplexer/demultiplexer 80 of FIG. 8 has an optical splitter including a 1×3 PLC as an optical branching unit 8100. The optical branching unit 8100 trifurcates light inputted from an input port 8001, and outputs to light wavelength separating units 8200. The light wavelength separating units 8200 have a 1×4 AWG that is capable of separation into four channels of 200 GHz intervals, and is constituted of a PLC likewise. A wavelength separating unit 8202 is an AWG which can select and separate a channel conforming to the ITU-T grids. A wavelength separating unit 8201 is an AWG for which a transmission peak frequency is shifted by −67 GHz which corresponds to the one third cycle relative to the wavelength separating unit 8202. A light wavelength separating unit 8203 is an AWG for which a transmission peak frequency is shifted by +67 GHz relative to the optical wavelength separating unit 8202.

In the fourth exemplary embodiment, the total of 12 output ports of the light wavelength separating units 8201-8203 are inputted to phase adjustment units 8501-8512. A phase adjustment unit 8500 is a device equipped with a function to control the phase of passing light from outside. For example, a structure of a device equipped with a phase adjustment function is disclosed in patent document 7. A phase adjustment unit 8500 suppresses interference between each optical path by adjusting the phase of light entering the optical matrix switch units 8300 for each optical path by controlling the phase of light passing through. As a result, deterioration of transmission characteristics of a multiplexer/demultiplexer is suppressed. Here, the control unit 8700 controls the phase adjustment unit 8500 via a control line 8720. Control of the phase adjustment unit 8500 by the control unit 8700 will be described later.

The outputs of the phase adjustment units 8501-8512 are connected with the 12×7 optical matrix switch units 8300. It is supposed that the outputs of the optical matrix switch units 8300 are output ports 8400. In detail, the output ports 8400 include a plurality of outputs 8401-8407 of the optical matrix switch units 8300.

Patent document 8 and a patent document 9 disclose technologies about an optical matrix switch. Patent document 8 discloses a multichannel optical switch capable of changing an optical path by controlling the inclination of a micro mirror continuously. Patent document 9 discloses an optical matrix switch composed by combining a plurality of waveguide-shaped optical switches. As disclosed in these patent documents, an optical matrix switch can change an optical path between input/output ports at high speed by an electric signal from outside.

In the fourth exemplary embodiment, the optical matrix switch units 8300 are composed using a plurality of pieces of waveguide-shaped optical switch 8301. A branch rate of each optical switch 8301 can be controlled electrically individually. The control unit 8700 controls the optical switch 8301 of the optical matrix switch units 8300 via a control line 8710. When light inputted from the phase adjustment units 8501-8512 is branched by one of the pieces of optical switch 8301 on respective optical paths and outputted to the output ports 8400 that are arranged on the optical paths of the branched light. Accordingly, by controlling a branch ratio of each optical switch 8301, it is possible to output light from a plurality of input ports uniformly to one of the output ports 8400. That is, by the optical matrix switch units 8300, an aggregation function is realized. For example, the optical paths inside the optical matrix switch units 8300 of FIG. 8 indicates the state in which light lays which have penetrated through phase adjustment units 8502, 8506 and 8510 are outputted to an output port 8402 of the optical matrix switch units 8300 simultaneously. By controlling an optical switch 8301, optional input light to the optical matrix switch units 8300 can be outputted to a specific port among the output ports 8400.

Thus, by controlling an optical path electrically using the optical matrix switch units 8300, the multiplexer/demultiplexer 80 can realize variable-band and variable-wavelength characteristics without the necessity of change of an optical path by hand. Further, by realizing the aggregation function using the optical matrix switch units 8300, the optical couplers 1300 shown in FIG. 1 become unnecessary.

In the fourth exemplary embodiment, output monitoring units 8601-8607 are connected to the output ports 8401-8407, respectively. The output monitoring units 8601-8607 perform monitoring of signals outputted from the output ports 8401-8407, and output the results to the control unit 8700 as monitoring information via a control line 8730. Then, the control unit 8700 controls the phase adjustment units 8501-8512 based on the information inputted from the output monitoring units 8601-8607 via the control line 8730.

For example, the output monitoring units 8601-8607 may measure a spectrum of light outputted from the output ports 8401-8407 and notify the control unit 8700 of the measurement result. Alternatively, they may measure light intensity of specific wavelengths outputted from the output ports 8401-8407 through a wavelength-variable filter, and notify the control unit 8700 of the measurement results.

Then, the control unit 8700 controls the phase adjustment units 8501-8512 based on the measurement results which have been notified of from the output monitoring units 8601-8607 so that the filter characteristics in each output ports 8401-8407 may be planarized. Here, a phase may be controlled always, or may be controlled at specific intervals.

By performing such control, it is possible to make wavelength characteristics of an output of the multiplexer/demultiplexer 80 further flatter.

Or, when light inputted to the multiplexer/demultiplexer 80 is a digital light signal, the output monitoring units 8601-8607 may measure an error rate of light signals outputted from the output ports 8401-8407 and notify the control unit 8700 of the measurement results.

The control unit 8700 may control the phase adjustment units 8501-8512 based on the measurement results of an error rate which have been notified of from the output monitoring units 8601-8607 so that the symbol error rate of a signal outputted from the output ports 8401-8407 may become smaller than a predetermined error rate, for example. Here, a target for which a symbol error rate is monitored may be an output signal of a specific output port, or may be an output signal of all output ports.

A degradation of quality of a light signal which passes through the multiplexer/demultiplexer 80 can be suppressed by performing such control.

As it has been described above, also the multiplexer/demultiplexer 80 described in the fourth exemplary embodiment has a transmitted wavelength and a transmission bandwidth that are variable, has flat wavelength characteristics of a transmission band, and enables to improve the utilization efficiency of a frequency. In addition, the multiplexer/demultiplexer 80 described in the fourth exemplary embodiment is composed without using LCOS and a grating or a fiber collimator and the like. For this reason, a small-sized and a low-price multiplexer/demultiplexer is realized.

In addition, in the multiplexer/demultiplexer 80 of the fourth exemplary embodiment, further cost reduction and reduction in a module size can be realized by using an optical matrix switch composed by a waveguide-type optical switches suitable for integration.

A multiplexer/demultiplexer of the fourth exemplary embodiment can be produced on a Si substrate by a Si waveguide by applying waveguide design used in a PLC device. Connection between each functional element is made by using a Si waveguide. Low-loss and flat wavelength selection filter characteristics can be realized by optimizing the length of a Si waveguide. In this regard, however, in consideration of compensation for a long-term deterioration and an environmental temperature change, a phase adjustment region is also integrated. Even when a structure of the fourth exemplary embodiment is integrated, the device size is below 1 cm×1 cm, and thus substantial miniaturization of a module can be realized.

Also, in the fourth exemplary embodiment, the phase adjustment units 8501-8512 adjust the phase of light which has passed each output port of the light wavelength separating units 8201-8203 based on information which an output monitoring unit outputs. As a result, a multiplexer/demultiplexer of the fourth exemplary embodiment can make an output level in the output ports 8400 further flatter, and can be controlled so that an error rate of a light signal passing may become shorter. Meanwhile, it is also possible to apply to the first to third exemplary embodiments the structure in which phase control units 8501-8512 and the output monitoring units 8601-8607 are included, and, based on monitoring information of the output monitoring units, the phase adjustment units 8501-8512 are controlled.

Further, because a multiplexer/demultiplexer of the fourth exemplary embodiment uses an optical matrix switch including a waveguide-type optical switch instead of an optical multiplexing unit, variable-wavelength characteristics and variable-band characteristics can be controlled at high speed. Meanwhile, the optical matrix switch units 8300 are not limited to one including a waveguide-type optical switch. For example, because high-speed switching is also possible by an optical matrix switch including a micro mirror, variable-wavelength characteristics and variable-band characteristics can also be controlled at high speed using an optical matrix switch including a micro mirror.

Meanwhile, it is obvious that it is also possible to employ the multiplexer/demultiplexer 80 of the fourth exemplary embodiment as an optical network node which distributes light signals inputted from other nodes to yet other nodes just like FIG. 11.

As above, in the first to fourth exemplary embodiments, description has been made regarding specific output ports and wavelengths with reference to a drawing. However, these indicate an exemplary embodiment, and the scope of the present invention is not limited to a specific port, the specific number of ports or a specific wavelength. It is clear that, also in other output ports, the similar effect is obtained by applying the structure described in the first to fourth exemplary embodiment. Various modifications which a person skilled in the art can understand can be performed in the composition and details of the present invention within the scope of the present invention.

INDUSTRIAL APPLICABILITY

As an example of utilization of the present invention, the following two are considered.

One is application to WDM-PON which is one of PON (Passive Optical Network). By this, a large capacity PON system introducing the OFDM technology can be introduced easily while maintaining a fiber structure of WDM-PON.

The other is application to current optical network nodes which WDM is mainly used. By introducing a wavelength multiplexer/demultiplexer such as an AWG used in existing nodes into the present apparatus, improvement of frequency efficiency by introduction of the OFDM technology can be realized. Further, operation in which the OFDM technology and an existing communication technology are mixed is also possible.

Although the present invention has been described with reference to exemplary embodiments above, the present invention is not limited to the above-mentioned exemplary embodiments and examples. Various modifications which a person skilled in the art can understand can be performed in the composition and details of the present invention within the scope of the present invention.

This application claims priority based on Japanese application Japanese Patent Application No. 2010-143957, filed on Jun. 24, 2010, the disclosure of which is incorporated herein in its entirety.

REFERENCE SIGNS LIST 10, 50, 70, 80 Optical multiplexer/demultiplexer
11, 71 Optical network node
21, 72-74 Optical fiber communication path
75-78 Transmitter/receiver
1000, 1001, 5001 Input port
1100, 1101, 5101 Optical branching unit
1200, 1201, 1202, 5200, 5201, 5202 Light wavelength separating unit
1300, 1301, 1302, 1303 . . . 1332 Optical coupler
1400, 1401, 1402, 1403 . . . 1432 Output port
2101-2106, 2201-2206 Output port
3001-3032 Transmitter/receiver
3104, 3105, 3106, 3204, 3205 Wavelength selection filter characteristics
4605 Example of wavelength characteristics
5300, 5304, 5305 Optical coupler
5404, 5405 Output port
5700 Control unit
5710, 5720 Control line
6604, 6605 Transmission characteristics
7000, 7001, 7002, 7003 Input port
7100, 7101, 7102, 7103 Optical branching unit
7200, 7201, 7202 Light wavelength separating unit
7300, 7301, 7302, 7303 Optical coupler
7400, 7401, 7402, 7403, 7404 Output port
8001 Input port
8100, 8101 Optical branching unit
8200, 8201, 8202, 8203 Light wavelength separating unit
8500-8512 Phase adjustment unit
8300 Optical matrix switch unit
8301 Optical switch
8400-8407 Output port
8601-8607 Output monitoring unit
8700 Control unit
8710, 8720, 8730 Control line

The invention claimed is:

1. A multiplexer/demultiplexer, comprising:
a first light branching unit configured to branch inputted light into a plurality of pieces of light and to output said branched pieces of light;
a plurality of light wavelength separating units configured to separate and output light outputted from said first light branching unit for each of predetermined frequency bands; and
an optical coupling unit configured to make outputs having different pieces of said frequency bands among outputs from said light wavelength separating unit gather with each other to output said gathered outputs;
wherein:
center frequencies of said frequency bands are arranged in a predetermined frequency interval,
said center frequencies of said plurality of light wavelength separating unit differ from each other;
each of said frequency bandwidths and intervals of respective said center frequencies of said plurality of light wavelength separating unit are identical, respectively; and
said multiplexer/demultiplexer includes said light wavelength separating unit of a quantity of a numerical value made by dividing said intervals of said center frequencies by said frequency bandwidths.

2. The multiplexer/demultiplexer according to claim 1, wherein, in one of the outputs of said optical coupling unit, said light wavelength separating unit and said optical coupling unit are connected such that at least two of said predetermined frequency bands are arranged next to each other.

3. The multiplexer/demultiplexer according to claim 1, wherein said optical coupling unit includes an optical matrix switch.

4. The multiplexer/demultiplexer according to claim 1, wherein said light branching unit, said light wavelength separating unit, said optical coupling unit and an optical waveguide connecting said light branching unit, said light wavelength separating unit and said optical coupling unit are formed by waveguide type devices integrated on one substrate.

5. An optical network node comprising a multiplexer/demultiplexer according to claim 1, wherein said optical network node includes: inputting light inputted from a first node to said multiplexer/demultiplexer and outputting light outputted from said multiplexer/demultiplexer to a second node.

6. A multiplexer/demultiplexer, comprising:
a first light branching unit configured to branch inputted light into a plurality of pieces of light and to output said branched pieces of light;
a plurality of light wavelength separating units configured to separate and output light outputted from said first light branching unit for each of predetermined frequency bands;
an optical coupling unit configured to make outputs having different pieces of said frequency bands among outputs from said light wavelength separating unit gather with each other to output said gathered outputs;

a phase adjustment unit configured to adjust a phase of light, said phase adjustment unit being arranged between said light wavelength separating unit and said optical coupling unit; and a first monitor unit configured to monitor light outputted from said optical coupling unit and to output predetermined monitoring information, wherein said phase adjustment unit controls said phase of light based on said monitoring information.

7. The multiplexer/demultiplexer according to claim 6, wherein said monitoring information is intensity of light outputted from said optical coupling unit.

8. The multiplexer/demultiplexer according to claim 6, wherein a signal inputted to said multiplexer/demultiplexer is a digital signal, and wherein said monitoring information is an error rate of said digital signal outputted from said optical coupling unit.

9. A multiplexer/demultiplexer, comprising:
a first light branching unit configured to branch inputted light into a plurality of pieces of light and to output said branched pieces of light;
a plurality of light wavelength separating units configured to separate and output light outputted from said first light branching unit for each of predetermined frequency bands; an optical coupling unit configured to make outputs having different pieces of said frequency bands among outputs from said light wavelength separating unit gather with each other to output said gathered outputs;
a second light branching unit provided between said light wavelength separating unit and said optical coupling unit;
an optical attenuation unit arranged between said light wavelength separating unit and said optical coupling unit; and a second monitor unit configured to output an optical level of light inputted to said optical coupling unit, wherein:
said second light branching unit branches light inputted from said light wavelength separating unit, and connects said branched light with optical coupling unit; and an attenuation amount of said optical attenuation unit is controlled based on said optical level.

10. A multiplexer/demultiplexer, comprising:
a first light branching unit that branches inputted light into a plurality of pieces of light and to output said branched pieces of light;
a plurality of light wavelength separating units configured to separate and output light outputted from said first light branching unit for each of predetermined frequency bands;
an optical coupling unit configured to make outputs having different pieces of said frequency bands among outputs from said light wavelength separating unit gather with each other to output said gathered outputs; and
a plurality of pieces of said first light branching unit, wherein:
said light wavelength separating unit includes an AWG (arrayed waveguide grating) outputting light inputted from an input port for each of said predetermined frequency bands;
said AWG is a cyclic AWG outputting light inputted from a plurality of input ports to an output port corresponding to an input port for each of said predetermined frequency bands; and
output of said first light branching unit is inputted to different pieces of said cyclic AWG, respectively.

\* \* \* \* \*